US005202959A

United States Patent [19]

Phillips

[11] Patent Number: 5,202,959

[45] Date of Patent: Apr. 13, 1993

[54] COLOR MEASUREMENT

[75] Inventor: Gordon L. P. Phillips, Cardiff, United Kingdom

[73] Assignee: Gordon Phillips Limited, Cardiff, England

[21] Appl. No.: 761,871

[22] PCT Filed: Feb. 8, 1991

[86] PCT No.: PCT/GB91/00204

§ 371 Date: Sep. 12, 1991

§ 102(e) Date: Sep. 12, 1991

[87] PCT Pub. No.: WO91/12500

PCT Pub. Date: Aug. 22, 1991

[30] Foreign Application Priority Data

Feb. 9, 1990 [GB] United Kingdom ................. 9002962

[51] Int. Cl.[5] ............................................. G06K 15/00

[52] U.S. Cl. ..................................... 395/109; 395/112

[58] Field of Search ........................ 395/101, 104, 112; 101/DIG. 45, DIG. 29, 171, 211; 364/552, 571.01; 355/326; 346/157; 358/75, 80, 461

[56] References Cited

U.S. PATENT DOCUMENTS 4,881,182 11/1984 Hank et al. .......................... 364/552

FOREIGN PATENT DOCUMENTS 0119836 9/1984 European Pat. Off. ............ 395/101

0324718 7/1989 European Pat. Off. ............ 395/101

OTHER PUBLICATIONS

Journal of the Opt. Soc. of Amer, vol. 68 No. 8 Aug. 1978 "Preparation of the USA.," pp. 1141-1142.

Din 16534, Oct. 1971: "Europäische Farbskala für den Offset Druck" Deutsche, Normen.

*Primary Examiner*—Arthur G. Evans

*Attorney, Agent, or Firm*—Young & Thompson

[57] ABSTRACT

A color referencing system is provided whereby a process color is first defined in terms of percentage levels of a number of base colors to create a standard reference, an ink mixture is experimentally defined for a flat color which corresponds in appearance to the process color and the CIELAB or other color difference equation value is determined by conventional means for that matched color. Such a system is only possible if the process color reference standard can be repeated without error. The illustration of the process colors in relation to their standard reference is therefore ideally achieved by the system as is defined in European Pat. No. 0119836. It is then possible to start from a flat color produced by single ink printing and reproduce this exactly as a process color by a predetermined combination of four colors using particular screened percentage values.

7 Claims, No Drawings

COLOR MEASUREMENT

In printing, colours can be produced in two ways:

(1) By using pigmented inks in a range only limited by the availability of pigments, to produce so called flat or solid colours by a single mix.

(2) By printing a smaller set of these colours using for example only the pigmented colours of cyan, magenta and yellow together with black. This method produces colours by using solid and/or screened values defined in percentage terms of the four inks superimposed one on the other. These are so called process colours.

Conventionally colours can be measured by means of one of various types of colour difference equations to give colorimetric values by a standard code such as that known as CIELAB numbers. This particular classification incorporates a combination of three factors which create a particular visual effect of a colour namely, (A) its hue, (B) pigment saturation level or degree of separation and (L) the degree of lightness which is a function of the ink thickness or density. The CIELAB standard for any particular colour can be measured by a number of known existing scientific methods. CIELAB numbers can be calculated from colours produced by either of the above methods. While such a code, if identical for two colours produced by both methods, would indicate that the colours are the same, there is no simple method of defining both the ink mix for the flat colour and the percentage values for the process colour which would be necessary to achieve these equivalent results.

Moreover it can be shown that although it is possible to start with a process colour and duplicate this as a flat colour by finding a given ink mix to achieve the same CIELAB numbers, the reverse is not true. There is no known method by which it is possible to start from a flat colour produced by the first method and reproduce this exactly as a process colour by any combination of the four colours using screened percentages of any value.

It is the object of this invention to provide a means whereby an adequate reference system of printed process colours can be duplicated by single ink flat colours to the same visual appearance and substantially identical colour difference equation values. Such a system then provides a simple means of producing a range of colours by either method without further calculation. This would enable a printer to create a flat colour which is equivalent to a process colour being used (and vice versa), where colour matching is necessary when printed material is being produced by differing methods.

Accordingly this invention provides a colour referencing system whereby a process colour is first defined in terms of percentage levels of a number of base colours to create a standard reference, an ink mixture is experimentally defined for a flat colour which corresponds in appearance to the process colour and the colour difference equation value is determined by conventional means for that matched colour.

Such a system is only possible if the process colour reference standard can be repeated without error. The illustration of the process colours in relation to their standard reference will ideally be by the system as is defined in our existing European Pat. No. 0119836.

In determining the equivalent flat colour for a particular process colour a spectrophotometer could be used to give an approximate measurement of the process colour and a possible flat colour mix could be calculated by a suitably programmed computer. This might give a number of possible choices of mixes of pigment to make a flat colour. These can be prepared and then compared by eye with the process colour. A skilled operator can then make the necessary small adjustments to the mixes to bring the flat colour as close in appearance to the process colour as it is possible to judge by eye.

An advantage of this method is that the number of pigments required for ink mixing purposes for the process colour method is largely confined to three or four colours. A most important advantage is that both sets of colours can be precisely defined in colorimetric values by their CIELAB codes. A further advantage is that the CIELAB value of the basic inks CYAN, MAGENTA, YELLOW and BLACK are precisely maintained to existing major international colour standards which are closely monitored and strongly supported.

It has already been shown that the particular process colour arrangement of European Pat. No. 0119836 allows for percentage specifications to be adjusted for a number of differing printing conditions in order that the reference process colour remains the same. Similarly it is possible to achieve the same colours by the flat colour method by adjusting ink formulations to allow for printing conditions which change by reason of differing substrates. Thus further calculations can be made to allow for circumstances which will vary the appearance of a colour. For example, a flat colour mix will give a different appearance when applied to coated stock paper as compared to its use on unprepared stock paper. The formula for the required flat colour (and its relevant CIELAB number) could be calculated separately depending on whether the colour is to be applied to coated or uncoated stock paper.

There could also be a variation in dot gain for the process colour depending upon the screen size and other printing factors, such as the ability of the paper to absorb the ink. Calculations could be made therefore to determine modifications of the percentages of the base colours used, for particular operational variations, to create a desired process colour which has the required visual similarity to the flat colour having a particular defined CIELAB number.

Once the required referencing of the process colours to flat colours, and variations for differing printing conditions and substrates, has been determined, in order to relate the colours formed by the two processes to the relevant CIELAB number, various additional systems can be envisaged. For example look-up tables can be created for various paper stocks to which the colours may be applied. The user can then select the correct formulation for a particular colorimetric value as defined by the relevant CIELAB number for a particular paper stock. Furthermore, programming control of the print heads of the printing press is possible to adjust the ink levels digitally to create a colour having the required CIELAB number. Indeed, the print head control could be determined from a direct reading from a spectrophotometer and densitometer applied to a particular colour which is to be matched. The reading (equivalent to a particular CIELAB number) will then be used as the control parameter to program the print heads outputs. This applies to the creation of both the process colour or the flat colour, for which suitable software control programs can be created and correlated with one another. This control is normally measured by density. The present concept therefore allows for better calibration and control of the printing machine.

It will be appreciated that the comparison with a standard set of printed process colour references may be made by this invention not only with other printed colours but also with colours achieved by any process. Also the system may be used for process colours created not only by dot screen printing but also by line printing such as with a laser printer.

Whilst reference has been made throughout the specification to CIELAB numbers, this is merely one particular system of a colour difference equation (although it is presently the most popular) from several which are used in the printing industry. Consequently, where the term CIELAB number or value is used this is intended to imply any standard number or value as defined by any colour difference or transformation equation which provides an adequate evaluation of a range of colours for which a correlation between the process colour and the flat colour is required.

I claim:

1. A colour referencing system whereby a process colour is first defined in terms of percentage levels of a number of base colours to create a standard reference in which there are a plurality of small printed process colour areas, each representing a different reference "tint" for use in the final colour printing, the said printed areas being arranged in identifiable groups, and all the printed areas in each group being printed by means of selected process colours, each at a uniform selected percentage density within the said group, and each printed area being individually identifiable, an ink mixture is experimentally defined for a flat colour which corresponds in appearance to the process colour, and the colour difference equation value is determined by conventional means for that matched colour.

2. A system according to claim 1, wherein a spectrophotometer is used to give an approximate measurement of the process colour and possible flat colour mixes are calculated, such as by a suitably programmed computer, prepared and compared by eye with the process colour, with any necessary small adjustments to the mixes being made to bring the flat colour as close in appearance to the process colour as it is possible to judge by eye.

3. A system according to claim 1, wherein ink formulations are adjusted to allow for printing conditions which change by reason of differing substrates, or by variation in dot gain for the process colour depending upon the screen size and other printing factors.

4. A system according to claim 3, wherein look-up tables are created for various paper stocks to which the colours may be applied.

5. A system according to claim 1, wherein programming control of the print heads of the printing press is provided to adjust the ink levels digitally to create a colour having the required colour difference equation number.

6. A system according to claim 5, wherein the print head control is determined from a direct reading from a spectrophotometer and densitometer applied to a particular colour which is to be matched.

7. A system according to claim 6, wherein the reading is used as the control parameter to program the print heads outputs.

* * * * *